(12) United States Patent
Rydén et al.

(10) Patent No.: US 11,012,820 B2
(45) Date of Patent: May 18, 2021

(54) NETWORK NODE, WIRELESS DEVICE AND METHODS PERFORMED THEREIN

(71) Applicant: Telefonaktiebolaget LM Ericsson (publ), Stockholm (SE)

(72) Inventors: Henrik Rydén, Solna (SE); Åke Busin, Sollentuna (SE); Fredrik Gunnarsson, Linköping (SE); Sara Modarres Razavi, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 221 days.

(21) Appl. No.: 16/061,382

(22) PCT Filed: May 4, 2018

(86) PCT No.: PCT/SE2018/050465
§ 371 (c)(1),
(2) Date: Jun. 12, 2018

(87) PCT Pub. No.: WO2018/203820
PCT Pub. Date: Nov. 8, 2018

(65) Prior Publication Data
US 2020/0084586 A1 Mar. 12, 2020

Related U.S. Application Data

(60) Provisional application No. 62/501,817, filed on May 5, 2017.

(51) Int. Cl.
*H04W 4/06* (2009.01)
*H04W 76/40* (2018.01)
(Continued)

(52) U.S. Cl.
CPC ............. *H04W 4/06* (2013.01); *H04L 12/189* (2013.01); *H04W 4/20* (2013.01); *H04W 72/005* (2013.01); *H04W 76/40* (2018.02)

(58) Field of Classification Search
CPC ....... H04W 4/06; H04W 72/005; H04W 4/20; H04W 76/40; H04W 4/02; H04L 12/189; G01S 19/05
See application file for complete search history.

(56) References Cited

U.S. PATENT DOCUMENTS

2005/0182565 A1    8/2005  Bourdeaut
2010/0232362 A1*   9/2010  Tenny .................. H04W 48/10
                                                      370/328
(Continued)

FOREIGN PATENT DOCUMENTS

WO         2018136224 A2     7/2018

OTHER PUBLICATIONS

Unknown, Author , "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.1.0, Mar. 2017, 164 pages.

(Continued)

*Primary Examiner* — Vinncelas Louis
(74) *Attorney, Agent, or Firm* — Murphy, Bilak & Homiller, PLLC

(57) ABSTRACT

Embodiments herein disclose e.g. a method performed by a network node (12,15) for managing positioning of a wireless device (10) in a wireless communications network. The network node, such as a location server determines whether to transmit positioning assistance data, to the wireless device (10) using unicast and/or using broadcast. The network node further triggers a transmission to the wireless device (10), of the positioning assistance data or an indication of the positioning assistance data for the wireless device (10) wherein the transmission is a unicast transmission and/or a broadcast transmission as determined.

6 Claims, 12 Drawing Sheets

(51) Int. Cl.
*H04L 12/18* (2006.01)
*H04W 4/20* (2018.01)
*H04W 72/00* (2009.01)

(56) References Cited

U.S. PATENT DOCUMENTS

| | | | |
|---|---|---|---|
| 2012/0009939 A1 | 1/2012 | Islam et al. | |
| 2013/0223626 A1* | 8/2013 | Edge | H04W 4/06 380/270 |
| 2014/0274136 A1 | 9/2014 | Edge et al. | |
| 2014/0349677 A1 | 11/2014 | Xiao et al. | |
| 2015/0201305 A1 | 7/2015 | Edge | |
| 2016/0029162 A1 | 1/2016 | Edge et al. | |
| 2016/0173388 A1 | 6/2016 | Alam et al. | |
| 2018/0132061 A1 | 5/2018 | Bitra et al. | |
| 2019/0230477 A1* | 7/2019 | Yu | G01S 19/05 |
| 2019/0373573 A1 | 12/2019 | Cui et al. | |

OTHER PUBLICATIONS

Unknown, Author, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP TS 36.305 V14.1.0, Mar. 2017, 78 pages.

Unknown, Author, "3rd Generation Partnership Project; Technical Specification Group Radio Access Network; Stage 2 functional specification of User Equipment (UE) positioning in UTRAN (Release 14)", 3GPP TS 25.305 V14.0.0, Mar. 2017, 95 pages.

Unknown, Author, "3rd Generation Partnership Project; Technical Specification Group Services and System Aspects; Functional stage 2 description of location services in UMTS (Release 1999)", 3GPP TS 23.171 V3.11.0, Mar. 2004, 53 pages.

Unknown, Author, "Differential GNSS (Global Navigation Satellite Systems) Services—Version 3", RTCM 10403.3, RTCM Paper 141-2016-SC104-STD, Radio Technical Commission for Maritime Services, Arlington, Virginia, Oct. 7, 2016, 285 pages.

Unknown, Author, "New WID: UE Positioning Accuracy Enhancements for LTE", 3GPP TSG RAN Meeting #75, RP-170813, Nokia, Alcatel-Lucent Shanghai Bell, Dubrovnik, Croatia, Mar. 6-9, 2017, 4 pages.

Unknown, Author, "Positioning Assistance Data Delivery to the UE", 3GPP TSG-RAN WG2 Meeting #66, R2-093257, Nokia Siemens Networks, Nokia Corporation, San Francisco, U.S.A, May 4-8, 2009, 3 pages.

Unknown, Author, "Positioning Enhancements for MDT", 3GPP TSG RAN WG2 Meeting #76, R2-116283, Intel Corporation, San Francisco, U.S.A, Nov. 14-18, 2011, 3 pages.

Unknown, Author, "Recommended Standards for Differential GNSS (Global Navigation Satellite Systems) Service", RTCM 10402.3, (RTCM Paper 136-2001/SC104-STD), with Amendment 1, Version 2.3, Radio Technical Commission for Maritime Services, Alexandria, Virginia, Aug. 20, 2001, 194 pages.

3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.3.0, Sep. 2017, pp. 1-168.

3GPP, "3rd Generation Partnership Project; Technical Specification Group Radio Access Network; Evolved Universal Terrestrial Radio Access (E-UTRA); LTE Positioning Protocol A (LPPa) (Release 14)", 3GPP TS 36.455 V14.3.0, Sep. 2017, pp. 1-74.

3GPP, "Universal Mobile Telecommunications System (UMTS); Stage 2 functional specification of User Equipment (UE) positioning in UTRAN (3GPP TS 25.305 version 14.0.0 Release 14)", ETSI TS 125 305 V14.0.0, Apr. 2017, pp. 1-97.

Unknown, Author, "Consideration on UE-based OTDOA positioning", LG Electronics Inc., 3GPP TSG-RAN WG2 Meeting #99bis, R2-1711689, Prague, Czech Republic, Oct. 9-13, 2017, 1-3.

Unknown, Author, "Considerations of providing assistance data", LG Electronics Inc., 3GPP TSG-RAN WG2 Meeting #99bis, R2-1711650, Prague, Czech Republic, Oct. 9-13, 2017, pp. 1-3.

Unknown, Author, "Discussion on OTDOA positioning", Huawei, 3GPP TSG-RAN WG2 Meeting #99bis, R2-1711316, Prague, Czech Republic, Oct. 9-13, 2018, pp. 1-4.

Unknown, Author, "Discussion on RTK procedures", Huawei, 3GPP TSG-RAN3 Meeting #97bis, R3-173513, Prague, Czech Republic, Oct. 9-13, 2017, pp. 1-4.

Unknown, Author, "GNSS Assistance Data Procedure in LPPa", Ericsson, 3GPP TSG-RAN WG3 #97bis, R3-173981, Prague, Czech Republic, Oct. 9-13, 2017, pp. 1-3.

Unknown, Author, "Positioning assistance data broadcasting", Ericsson, 3GPP TSG-RAN WG2 #98, R2-1704745, Hangzhou, P.R. of China, May 15-19, 2017, pp. 1-3.

* cited by examiner

NETWORK NODE, WIRELESS DEVICE AND METHODS PERFORMED THEREIN

TECHNICAL FIELD

Embodiments herein relate to a network node, a wireless device and methods performed therein. Furthermore, a computer program product and a computer-readable storage medium are also provided herein. In particular, embodiments herein relate to managing or handling positioning of the wireless device in a wireless communications network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area and provides radio coverage over service areas or cell areas, which may also be referred to as a beam or a beam group, with each service area or beam being served or controlled by a radio network node such as a radio access node e.g., a Wi-Fi access point or a radio base station (RBS), which in some networks may also be denoted, for example, a NodeB, an eNodeB, or a gNodeB. The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Wireless device positioning is recognized as an important feature for LTE networks due to its potential for massive commercial applications, for example intelligent transportation, entertainment, industry automation, robotics, remote operation, healthcare, smart parking and so on, as well as its relevance to United States Federal communications commission (US FCC) E911 requirements for emergency services.

Positioning in LTE is supported by the architecture in FIG. 1a, with direct interactions between a wireless device and a location server e.g. an Evolved Serving Mobile Location Center (E-SMLC) via the LTE Positioning Protocol (LPP). Moreover, there are also interactions between the location server and a radio network node such as an eNodeB (eNB) via the LTE Positioning Protocol annex (LPPa) protocol, to some extent supported by interactions between the eNodeB and the wireless device via the Radio Resource Control (RRC) protocol. Positioning request may e.g. come from the wireless device, a Mobility Management Entity (MME) or a Gateway Mobile Location Centre (GMLC).

The following positioning techniques are disclosed in LTE:

Enhanced Cell ID (E-CID). Essentially cell ID information to associate the wireless device to the serving area of a serving cell, and then additional information to determine a finer granularity position.

Assisted Global Navigation Satellite Systems (GNSS). GNSS information retrieved by the wireless device, supported by assistance information provided to the wireless device from the E-SMLC.

Observed Time Difference of Arrival (OTDOA). The wireless device estimates the time difference of reference signals from different base stations and sends the estimated time differences to the E-SMLC for multilateration to determine the location of the wireless device.

Uplink Time Difference of Arrival (UTDOA). The wireless device is requested to transmit a specific waveform that is detected by multiple location measurement units, e.g. an eNB, at known positions. These measurements are forwarded to E-SMLC for multilateration to determine the location of the wireless device.

The positioning techniques can be supported by assistance data from the location server to the wireless device. Typically, the wireless device either requests and the location server provides assistance data, or the location server provides assistance data unsolicited i.e. unrequested, as illustrated by FIG. 1b.

Recent enhancements in GNSS technology include support for very precise positioning, where the wireless device may interact with a network node to obtain specific measurement correction information. Much of these are captured by the specification work of Radio Technical Commission for Maritime Services (RTCM). One example is Real Time Kinematic (RTK) GNSS, which is a differential GNSS positioning technology enabling positioning accuracy improvement from meter level to decimeter or even centimeter level in the right conditions in real-time by exploiting the carrier phase of the GNSS signal rather than only the code phase. Support for RTK GNSS in LTE networks should therefore be provided and are under standardization in the Release 15 work item. The support for RTK in LTE networks comprises reporting RTK correction data to the wireless device. Two versions of reporting RTK correction data, also referred to as RTK data, to the wireless device are currently under discussion, the first known method is to broadcast the information from base stations by extending the system information bits. The other method is to send the information to each wireless device individually, for example via LPP. In addition, the wireless device can also interact with an RTK server over the application layer directly.

The problem with broadcasted positioning assistance data such as RTK correction data is that it is always transmitted, even when no user requests the positioning assistance data. Providing positioning assistance data via dedicated signalling (e.g. via LPP) may result in multiple wireless devices receiving the same information which causes unnecessary resource overhead. For example, RTK correction data could be some kilobytes that needs to be updated often, which then scales badly if many wireless devices requests RTK correction data individually.

SUMMARY

An object herein is to provide a mechanism that enables or manages positioning of a wireless device in a wireless communications network in an efficient manner.

According to an aspect the object is achieved by providing a method performed by a network node such as a location server or a radio network node for managing positioning of a wireless device in a wireless communications network. The network node determines whether to transmit the positioning assistance data, to the wireless device, using unicast and/or using broadcast. The network node further triggers a transmission of the positioning assistance data or an indication of the positioning assistance data for the wireless device, wherein the transmission is a unicast transmission and/or a broadcast transmission to the wireless device as determined.

According to another aspect the object is achieved by providing a method performed by a wireless device for handling positioning of the wireless device in a wireless communications network. The wireless device receives from a network node, positioning assistance data or an indication of the positioning assistance data for the wireless device in a unicast transmission and/or a broadcast transmission. The wireless device further uses the positioning assistance data in a positioning process.

It is furthermore provided herein a computer program product comprising instructions, which, when executed on at least one processor, cause the at least one processor to carry out any of the methods above, as performed by the wireless device or network node. It is additionally provided herein a computer-readable storage medium, having stored thereon a computer program product comprising instructions which, when executed on at least one processor, cause the at least one processor to carry out the method according to any of the methods above, as performed by the wireless device or network node.

According to yet another aspect the object is achieved by providing a network node for managing positioning of a wireless device in a wireless communications network.

The network node is configured to determine whether to transmit the positioning assistance data, to the wireless device, using unicast and/or using broadcast. The network node is further configured to trigger a transmission of the positioning assistance data or an indication of the positioning assistance data for the wireless device, wherein the transmission is a unicast transmission and/or a broadcast transmission to the wireless device as determined.

According to still another aspect the object is achieved by providing a wireless device for handling positioning of the wireless device in a wireless communications network. The wireless device is configured to receive from a network node, positioning assistance data or an indication of the positioning assistance data for the wireless device in a unicast transmission and/or a broadcast transmission. The wireless device further uses the positioning assistance data in a positioning process.

According to yet still another aspect the object is achieved by providing a network node comprising processing circuitry configured to determine whether to transmit positioning assistance data, to the wireless device using unicast and/or using broadcast. The processing circuitry is further configured to trigger a transmission, to the wireless device, of the positioning assistance data or an indication of the positioning assistance data for the wireless device wherein the transmission is a unicast transmission and/or a broadcast transmission to the wireless device as determined.

According to another aspect the object is achieved by providing a wireless device comprising processing circuitry configured to receive from a network node, positioning assistance data or an indication of the positioning assistance data for the wireless device in a unicast transmission and/or a broadcast transmission. The processing circuitry is further configured to use the positioning assistance data in a positioning process.

According to embodiments the network node provides a more efficient signalling of the positioning assistance data compared with either dedicated or generally broadcasted transmission, since the network node may trigger the transmission of e.g. positioning assistance data to only wireless devices which need the mentioned positioning assistance data. Embodiments provide less resource utilization in comparison with dedicated signalling, since several wireless devices may share the same assistance data transmission when it is motivated from a resource consumption perspective. Furthermore, the adaptive unicast and/or broadcast solution comprises a criterion that may take the resource costs into account. This would allow the network node to trade-off between unicast and broadcast based assistance data transmission. The resource cost optimization may be particularly important considering the relatively costly GNSS augmentation, both in volume and in update rate. A typical example of the positioning assistance data is RTK, and the positioning assistance data may be updated even every second. As aforementioned, using Multicast-broadcast single-frequency network (MBSFN) improves the detection of broadcasted data, since multiple cells transmits the same positioning assistance data which improves the signal quality at the wireless device.

BRIEF DESCRIPTION OF THE DRAWINGS

Embodiments will now be described in more detail in relation to the enclosed drawings, in which.

DETAILED DESCRIPTION

Figure 1A:
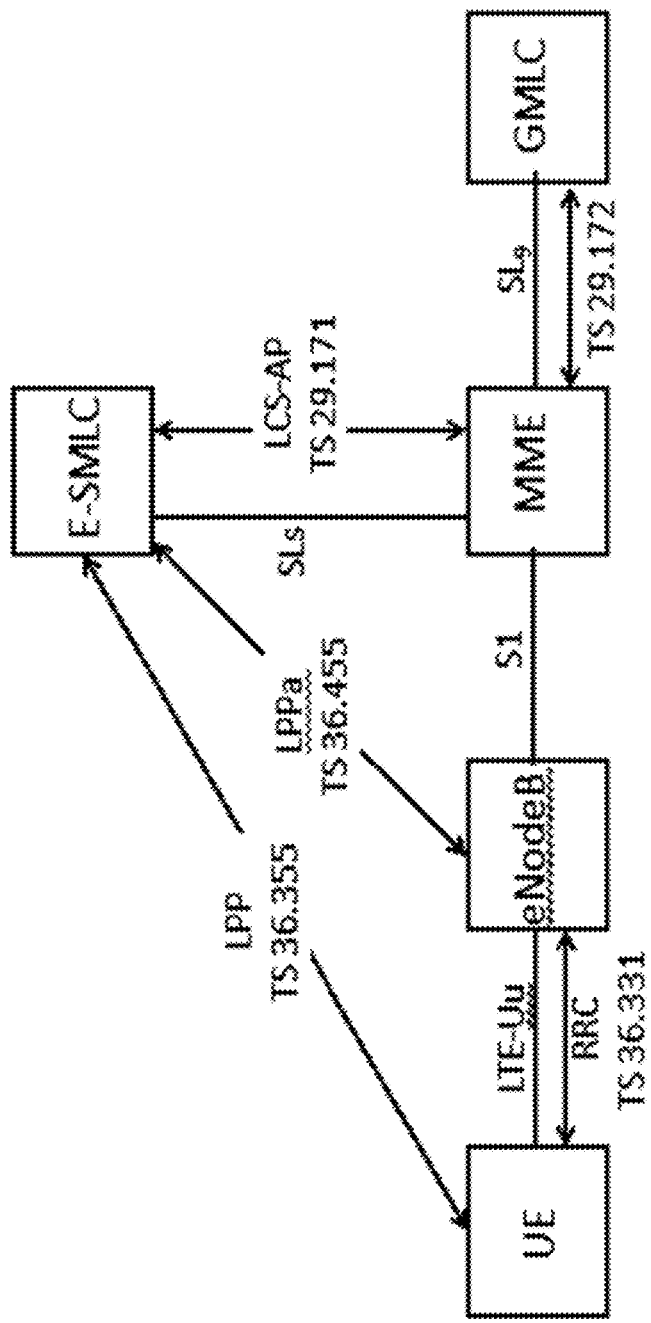
FIG. 1a is a schematic overview depicting an LTE positioning architecture according to prior art.
Figure 1B:
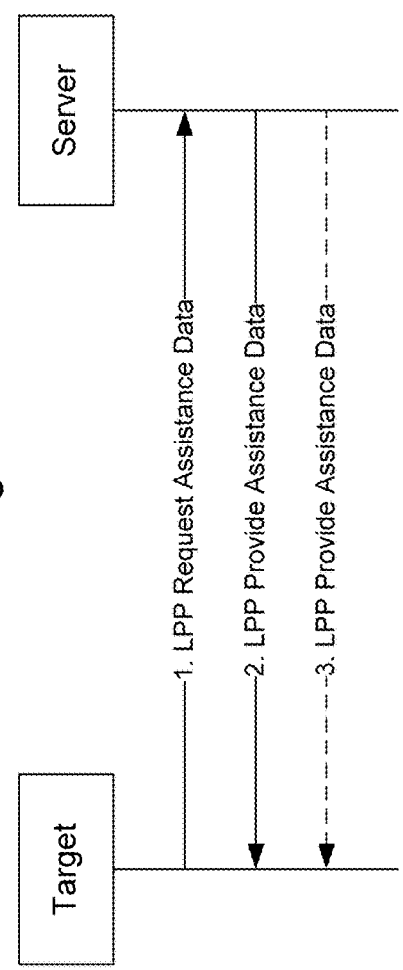
FIG. 1b is a signalling scheme according to prior art.
Figure 2:
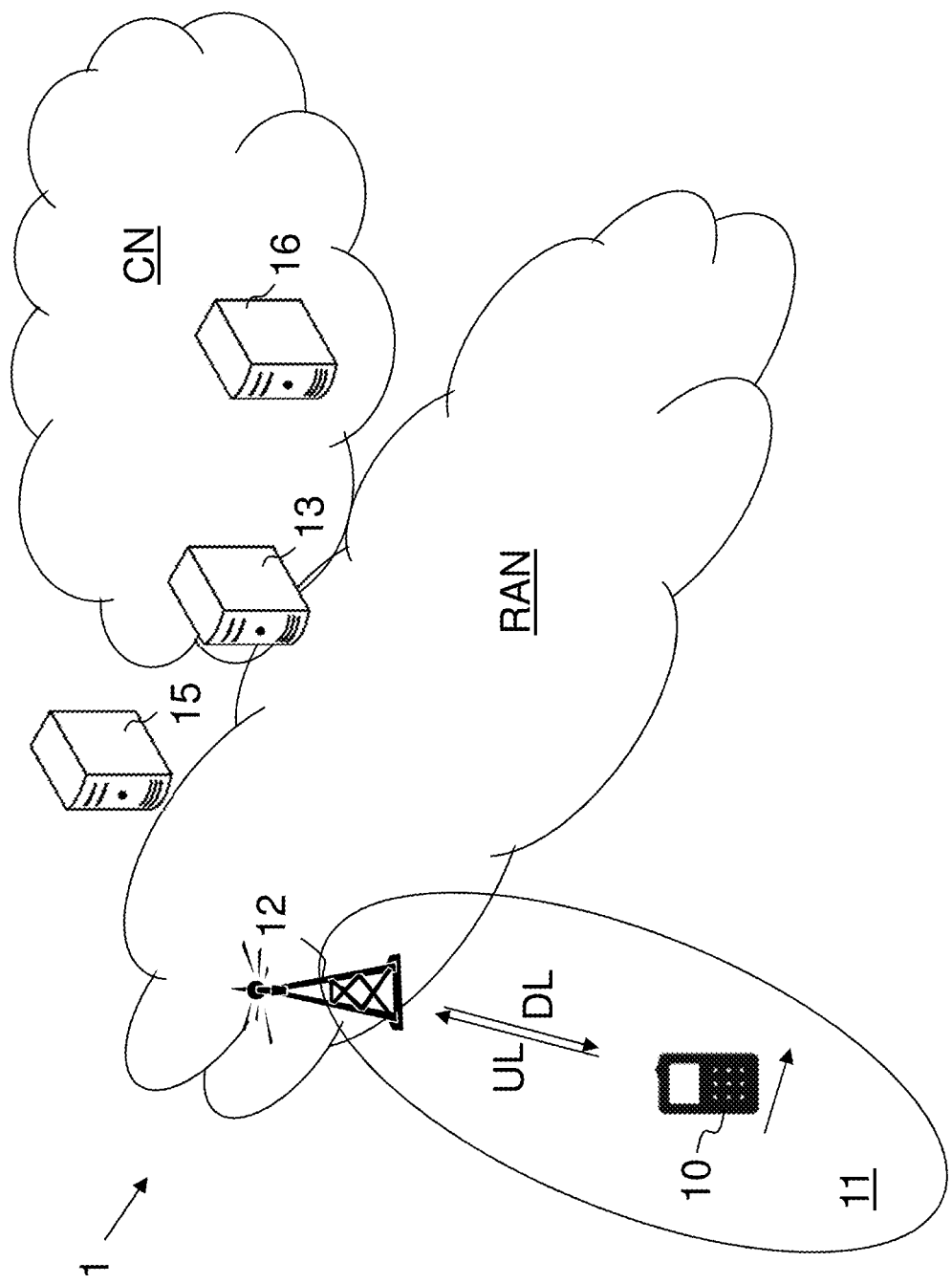
FIG. 2 is a schematic diagram depicting a wireless communications network according to embodiments herein.

Embodiments herein relate to wireless communications networks in general. FIG. 2 is a schematic overview depicting a wireless communications network 1. The wireless communications network 1 comprises one or more RANs and one or more CNs. The wireless communications network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in an LTE context, however, embodiments are also applicable in further development of the existing wireless communications networks such as e.g. WCDMA and 5G.

In the wireless communications network 1, a wireless device 10, such as a mobile station, a non-access point (non-AP) station (STA), a STA, a user equipment and/or a wireless terminal, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 may be referred to as a serving radio network node and communicates with the wireless device 10 with Downlink (DL) transmissions to the wireless device 10 and Uplink (UL) transmissions from the wireless device 10.

The wireless communications network 1 may comprise a number of network nodes or core network nodes. For example, the wireless communications network 1 may comprise a controlling network node 13 such as a Mobility Management Entity (MME), a Serving GPRS Support Node (SGSN), a server keeping track of wireless devices, or similar. The controlling network node 13 controls or manages wireless devices in service areas in the wireless communications network 1. The wireless communications network 1 may further comprise a location server 15 such as an e-SMLC for positioning wireless devices in the wireless communications network. The wireless communications network 1 may in addition comprise another network node 16 such as a an operation, administration, and maintenance (OAM) node, a gateway, a location controlling node, a Gateway Mobile Location Centre (GMLC) configured to retrieve location or position of wireless devices in wireless communications network 1.

According to some embodiments herein a network node, such as the radio network node 12 or the location server 15, determines how to signal positioning assistance data, e.g. whether to transmit the positioning assistance data, to the wireless device 10 using unicast and broadcast e.g. multicast. The network node then triggers transmission of the positioning assistance data or an indication of the positioning assistance data for the wireless device 10 using the determined signalling i.e. using unicast and/or broadcast. The wireless device 10 receives and uses the positioning assistance data for positioning the wireless device 10.

The positioning assistance data may be broadcast using Multimedia broadcast multicast services (MBMS), which support broadcast services within a single network. This implies that the same information is provided to multiple wireless devices in the same time-frequency resources, and the wireless devices can be dispersed over a wide area, even in different cells. MBMS is used in situations when it is better to broadcast the positioning assistance data instead of doing individual transmissions to each wireless device i.e. unicast. One MBMS mechanism is Multicast-broadcast single-frequency network (MBSFN) where multiple cells transmit the same information, if the broadcasted transmissions are truly identical and transmitted time aligned, the wireless device 10 may receive the signal from the multiple cells and increase the signal quality which leads to better detection. The signal quality is especially increased for cell edge wireless devices.

An advantage is that embodiments herein provide a more efficient signalling of positioning assistance data compared with a broadcasted transmission, since the network node may trigger the transmission of positioning assistance data only to wireless devices which need the mentioned positioning assistance data, e.g. as indicated by requesting the positioning assistance data. The solution also provides less resource utilization in comparison with dedicated signalling, since e.g. two or more wireless devices may share the same positioning assistance data. Hence embodiments herein adapt positioning assistance data provisioning via either unicast, broadcast or a combination, based on e.g. requests and/or subscription information. The broadcast provisioning may be performed with MBMS or system information.

Figure 3:
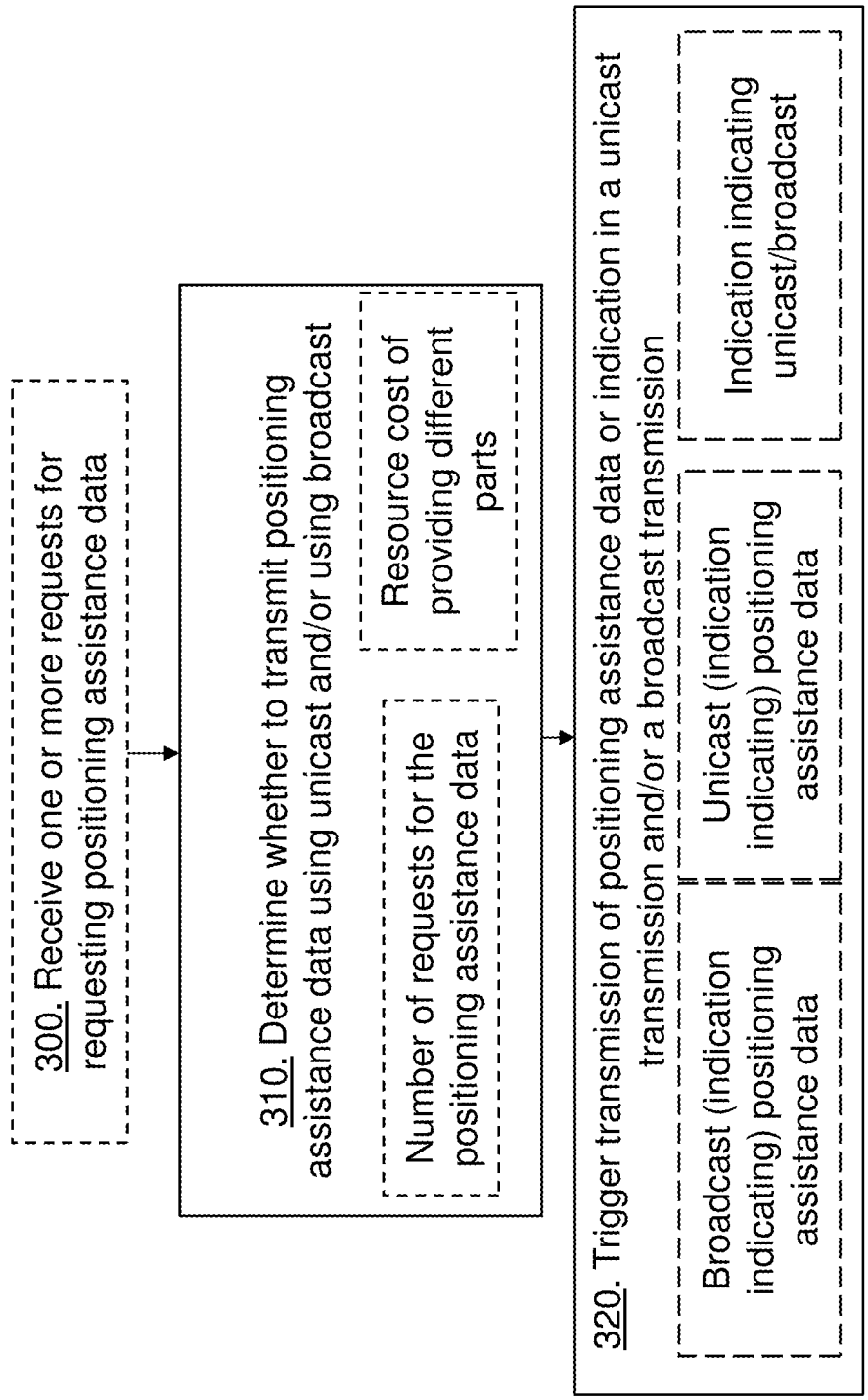
FIG. 3 is a flowchart depicting a method performed by a network node such as a location server according to embodiments herein.

The method actions performed by the network node, such as the location server 15 or the radio network node 12, for managing positioning of the wireless device 10 in the wireless communications network 1 according to embodiments herein will now be described with reference to a flowchart depicted in FIG. 3. The actions do not have to be taken in the order stated below, but may be taken in any suitable order. Actions performed in some embodiments are marked with dashed boxes.

Action 300. The network node such as the location server 15 may receive one or more requests requesting positioning assistance data, also referred to as positioning correction data or assistance data such as RTK correction data, from one or more wireless devices.

Action 310. The network node determines whether to transmit positioning assistance data, to the wireless device 10 using unicast and/or using broadcast. E.g. the network node may determine whether to transmit using unicast and/or broadcast based on requests and/or subscription information of the wireless device 10. The network node may determine whether to transmit using unicast and/or broadcast based on number of requests for the positioning assistance data to the network node. The network node may determine whether to transmit using unicast and/or broadcast based on resource cost of providing different parts of the positioning assistance data. Thus, the network node may determine a manner of signalling the positioning assistance data to the wireless device 10. The network node may e.g. determine to transmit the positioning assistance data using a unicast and/or a broadcast. The network node may determine the manner of signalling based on number of wireless devices requesting the positioning assistance data.

Action 320. The network node triggers transmission of the positioning assistance data or an indication of the positioning assistance data for the wireless device 10. The transmission is a unicast transmission and/or a broadcast transmission to the wireless device 10 as determined. The network node may e.g. trigger the transmission and further trigger transmission of an indication indicating that the positioning assistance data is broadcast and/or unicast. Thus, the network node may send the positioning assistance data as determined, i.e. the positioning assistance data is either signaled using unicast transmissions (dedicated signalling) and/or broadcast e.g. MBSFN transmitted to the wireless device 10. The network node may transmit an indication indicating positioning assistance data using multicast, or broadcast, or may transmit an indication indicating positioning assistance data using unicast (dedicated signalling). The transmission may performed by the network node in case the network node is a radio network node or the transmission may be performed by a radio network node in case the network node is a location server or similar.

Figure 4:
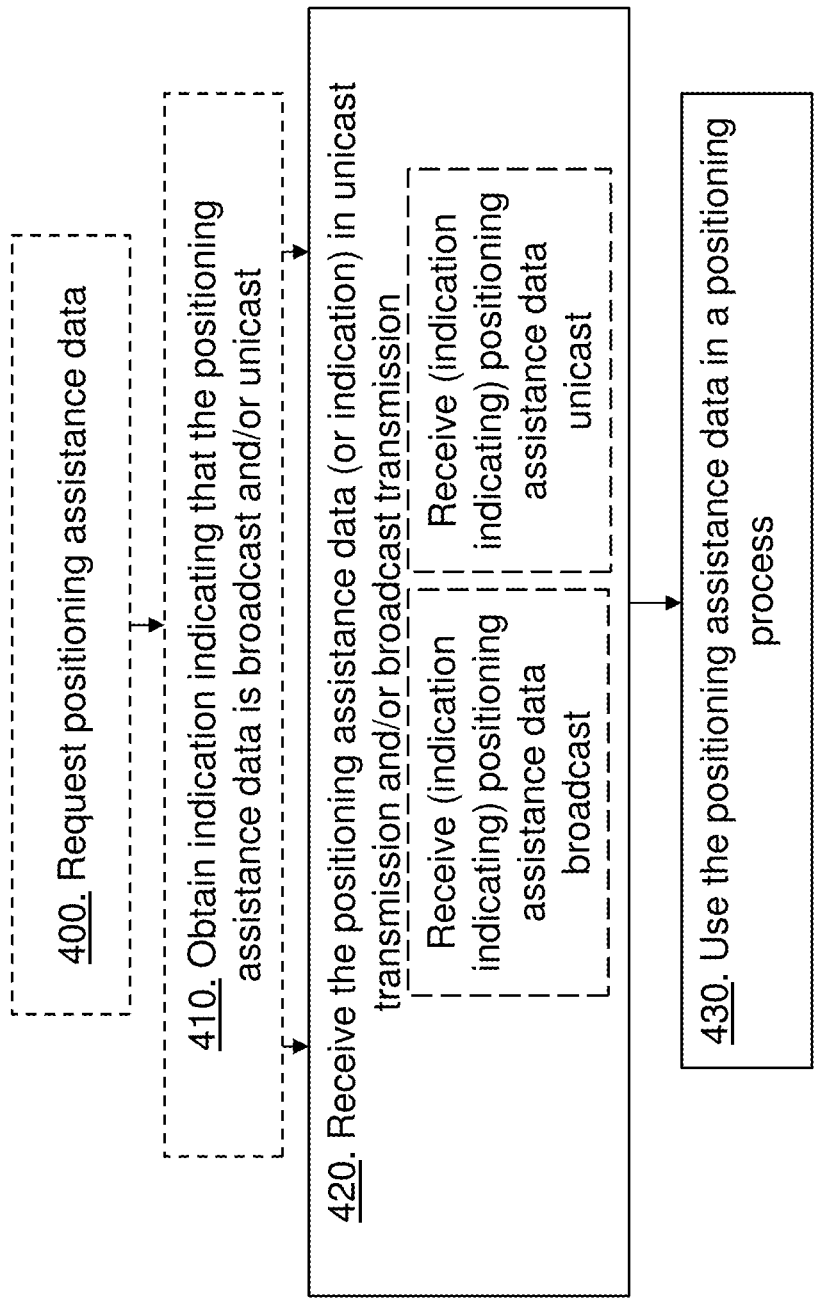
FIG. 4 is a flowchart depicting a method performed by a wireless device according to embodiments herein.

The method actions performed by the wireless device 10 for handling positioning of the wireless device 10 in the wireless communications network according to embodiments will now be described with reference to a flowchart depicted in FIG. 4. The actions do not have to be taken in the order stated below, but may be taken in any suitable order. Actions performed in some embodiments are marked with dashed boxes.

Action 400. The wireless device 10 may request the positioning assistance data from the network node.

Action 410. The wireless device 10 may obtain e.g. receive, from the network node, an indication indicating that the positioning assistance data is broadcast and/or unicast i.e. indicating how to receive the positioning assistance data, i.e. either unicast and/or broadcast.

Action 420. The wireless device 10 receives from the network node, e.g. from the location server 15 or via the radio network node 12, positioning assistance data or an indication of the positioning assistance data for the wireless device 10 in a unicast transmission and/or a broadcast transmission.

Action 430. The wireless device 10 uses the positioning assistance data in a positioning process.

Figure 5A:
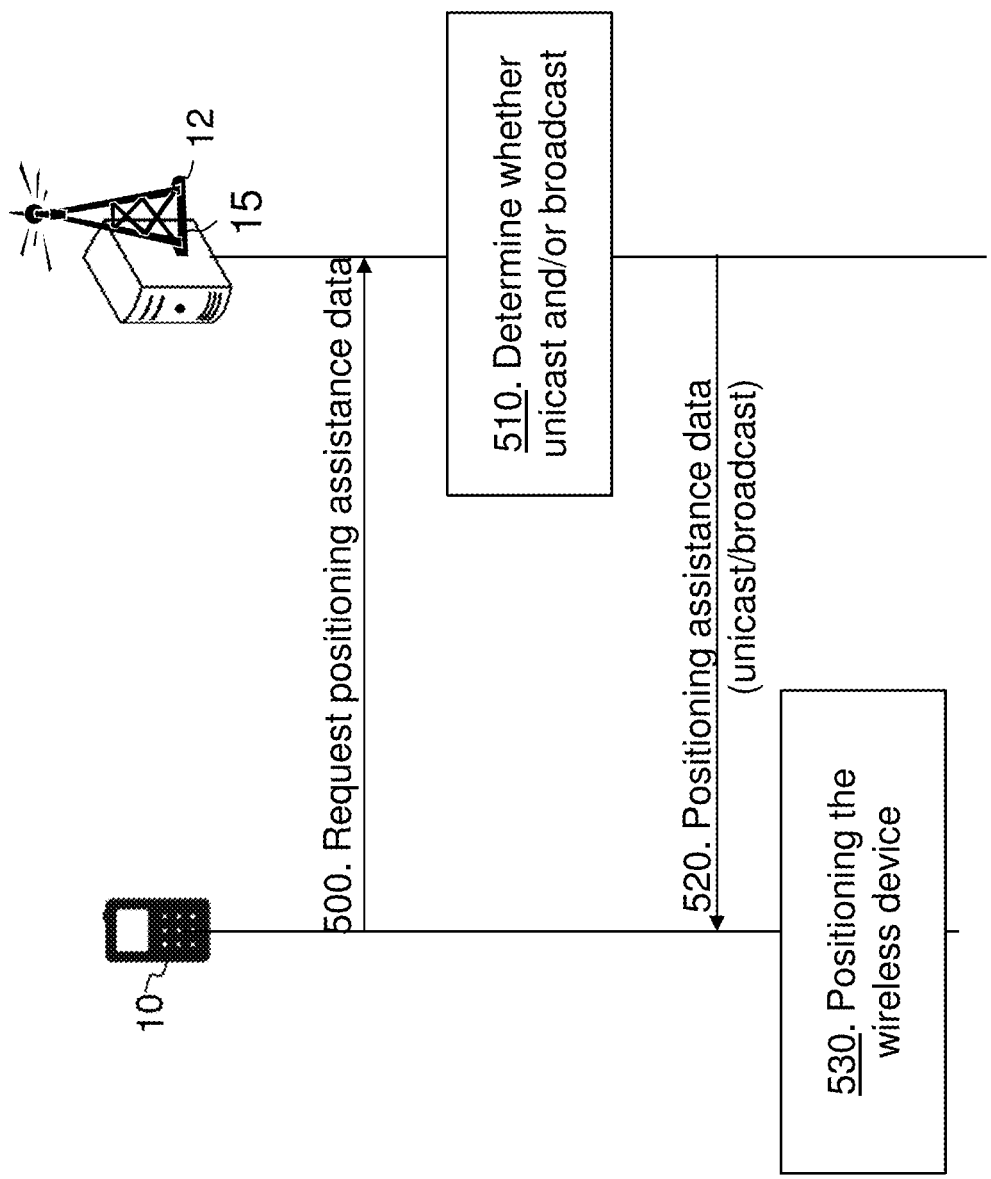
FIG. 5a is a combined flowchart and signalling scheme according to embodiments herein.

FIG. 5 is a combined flowchart and signalling scheme according to embodiments herein. Embodiments herein propose a method of activating and signal positioning assistance data via e.g. MBMS. The network node may be a node that controls one or more cells. In another embodiment, the network node equals the location server, such as an E-SMLC.

Action 500. The wireless device 10 may transmit a request of receiving positioning assistance data, the request may indicate the positioning assistance data e.g. certain correction data, optionally the request also includes information of desired assistance data frequency, i.e. what parts of the positioning assistance data. The wireless device 10 may request positioning assistance data from the network node. In one embodiment, the request is sent to the location server 15. In another embodiment, the request is sent to a radio network node such as the radio network node 12, for example, via a radio resource control (RRC) protocol.

The request may comprise requests for specific assistance data, for example characterized by the positioning method, the level of detail or accuracy, the update rate etc. In the specific case of requesting GNSS assistance data, the specific request may concern a different satellite system, atmospheric corrections in the ionosphere and/or troposphere, ephemeris, clock corrections and almanac, reference time and position, the type of corrections such as differential GNSS relating to GNSS code phase measurement, RTK corrections relating to GNSS carrier phase measurements, precise point positioning (PPP) corrections relating to detailed satellite orbit trajectories and clock offsets, etc.

In the specific case of OTDOA or UTDOA assistance data, the request may concern information about the positioning reference signals, coordinates of the radio network nodes such as base stations or transmission points, network synchronization information, etc.

Some of the positioning assistance data may be semi-static, while other parts of the positioning assistance data may be dynamic. Therefore, the wireless device 10 may also request a certain update rate for the dynamic data. For example, when the wireless device 10 connects to the network, it can request to receive positioning assistance data.

Action 510. The network node determines the manner to transmit the positioning assistance data to the wireless device e.g. using a dedicated signalling, called unicast, and/or using a broadcast of the positioning assistance data. The network node may check how many wireless devices that are requesting different parts of the positioning assistance data for a specified region that can be from one cell, one radio base station, a subset of cells or radio base stations in the network. The network node may also determine the total resource cost of providing the different parts of the positioning assistance data. The network node also considers the requested update rate of the positioning assistance data. If sufficiently many wireless devices are requesting a part of the positioning assistance data, or if the total resource cost of provisioning a part of the positioning assistance data is sufficiently large, for example compared to a configurable threshold, the network node may conclude that the positioning assistance data or that part of the positioning assistance data may be provided via broadcast. Thereby, some positioning assistance data may be provided via broadcast, while other positioning assistance data may be provided via unicast. The positioning assistance data at some update rate may be provided via broadcast, while the same positioning assistance data will be provided via unicast at a faster update rate.

In one embodiment, the wireless device 10 reports its required positioning assistance data frequency. The wireless devices need different frequency of positioning assistance data based on the mobility and positioning requirements of the wireless device 10. The network node can then select the positioning assistance data update rate based on the wireless device 10 with a tightest update requirement, i.e. a wireless device with high precision requirement. Or in another embodiment, the average wireless device-required update rate. In another embodiment, if the update rate provided via broadcast is not sufficient for a wireless device, the network node may transmit additional unicast positioning assistance data to said wireless device 10.

The network node may determine manner of signalling based on number of requests for the positioning assistance data. For example, the network node checks whether the wireless device 10 has permission to receive the requested positioning assistance data. Hence, if the wireless device's subscription matches the positioning assistance data the wireless device 10 is requesting the wireless device 10 is permitted to receive the requested positioning assistance data. Optionally, the network node may check wireless device subscription information from a user subscription register function in the network. Some of the positioning assistance data may be available in the network node, while some may need to be retrieved from a different network function. One example is differential GNSS or RTK information being examples of positioning assistance data, which can be prepared or updated at a different network function. In case of RTK information, the network node may prepare correction information for a set of virtual reference stations (VRS) in a service area where the operator is providing communication services.

The network node may then check how many wireless devices that are requesting said positioning assistance data for a specified region that can be from one cell to a subset of cells in the wireless communications network, if sufficiently many wireless devices are requesting the positioning assistance data and/or type, the network node activates the transmission via e.g. MBMS. Furthermore, in this action, the network node may configure a frequency of the positioning assistance data, i.e. how often to transmit the positioning assistance data. A frequent transmission increases the resource overhead for RTK data, while a less frequent transmission leads to a lower GNSS position accuracy. One alternative is to classify the updates to slow and fast updates. In some embodiments, the wireless device 10 reports its required positioning assistance data frequency. The wireless devices need different frequencies of positioning assistance data based on their mobility and positioning requirements. The network node may then select the positioning assistance data frequency based on a wireless device with a tightest RTK update requirements, the wireless device with high precision requirement, alternatively an average of wireless device-required RTK data frequency may be used. If the MBMS RTK data frequency is not sufficient for the wireless device 10, the network node can transmit additional RTK data to said wireless device 10. The positioning assistance data comprises e.g. correction data from one or more RTK reference stations.

Action 520. The network node sends the positioning assistance data as determined, i.e. the positioning assistance data is either signaled using dedicated signalling, i.e. unicasted, and/or broadcasted such as multicasted e.g. MBSFN to the wireless device 10. Thus, the network node may determine to broadcast the positioning assistance data using a plurality of radio network nodes. The network node may trigger transmission of the positioning assistance data or an indication of the positioning assistance data, e.g. an indication pointing to the positioning assistance data in e.g. system information.

If the network node selects to unicast the positioning assistance data, the wireless device 10 may receive the positioning assistance data via e.g. LPP. The wireless device 10 may alternatively receive the positioning assistance data via RRC, the location server could provide the mentioned data via LPPa to the wireless device's serving node. The network node can provide assistance data via unicast for example in one embodiment from location server 15 to the wireless device 10 via LPP, in another embodiment from radio network node 12 to the wireless device 10 via RRC or similar, or from server to the wireless device 10 via the application layer. The positioning assistance data for provisioning by a radio base station via RRC may in different embodiments be retrieved directly from a server via the application layer
retrieved from the location server via LPPa.

If the network node selects to broadcast the positioning assistance data, the positioning assistance data is provided to the wireless device 10 via e.g.:

System information from radio network nodes. The system information may be optionally encrypted to control access to the broadcast information. The wireless device 10 is configured via either the radio network node 12 or the location server 15 with the encryption configuration;

MBMS from radio base stations. The wireless device 10 is configured via either the radio base station or the location server with the MBMS channel configuration.

The positioning assistance data for provisioning by the radio network node 12 via broadcast may in different embodiments be retrieved directly from a server via the application layer, or
retrieved from the location server 15 via LPPa.

The radio network node 12 may provide several versions of the positioning assistance data, for example representing different parts of the positioning assistance data, but also representing different parts of the coverage area. The wireless device 10 may then retrieve the correct set of assistance data by a matching procedure. The matching may be based on:

the requested positioning assistance data parts of the wireless device 10,
the subscription or services of the wireless device 10,
an estimated position of the wireless device 10 and an associated position of the positioning assistance data, and the wireless device 10 selects the assistance data that corresponds to a closest position of the positioning assistance data,
a radio measurement of the wireless device 10 compared to associated radio measurements of the positioning assistance data, for example a ranging measurement of the wireless device 10 to the radio network node 12 compared to ranging information per assistance data part.

If the network node selects to use a MBMS transmission, the wireless device 10 may receive the details of the MBMS transmission via LPP, or in another embodiment, via LPPa+ RRC. The positioning assistance data to be broadcasted may be defined in a System Information Block (SIB) which is dedicated to the positioning assistance information. The SIB may comprise at least one of:

- reference time and position
- differential GNSS (DGNSS) corrections
- ephemeris, clock corrections and almanac
- different blocks for different satellite systems In one embodiment the SIB may comprise different blocks dedicated to different broadcast positioning information, i.e. the SIB may comprise at least one of:

- One block dedicated to OTDOA assistance information
- One block dedicated to A-GNSS
- One block dedicated to DGNSS and RTK data
- One block to a more accurate satellite info called Precise Point Positioning (PPP) info including position/trajectories and clock offsets.

The SIB may be defined in the location server and communicated to the network node via LPPa. The wireless device 10 may use part or all part of the SIB based on its authorization access indicated by the network node such as the location server.

Action 530. The wireless device 10 uses the positioning assistance data for positioning the wireless device 10. Thus, the wireless device 10 receives the positioning assistance data and calculates its position. In one embodiment, the position is reported to the network node. The wireless device 10 may use part or all part of the SIB based on its authorization access indicated by the location server.

Figure 5B:
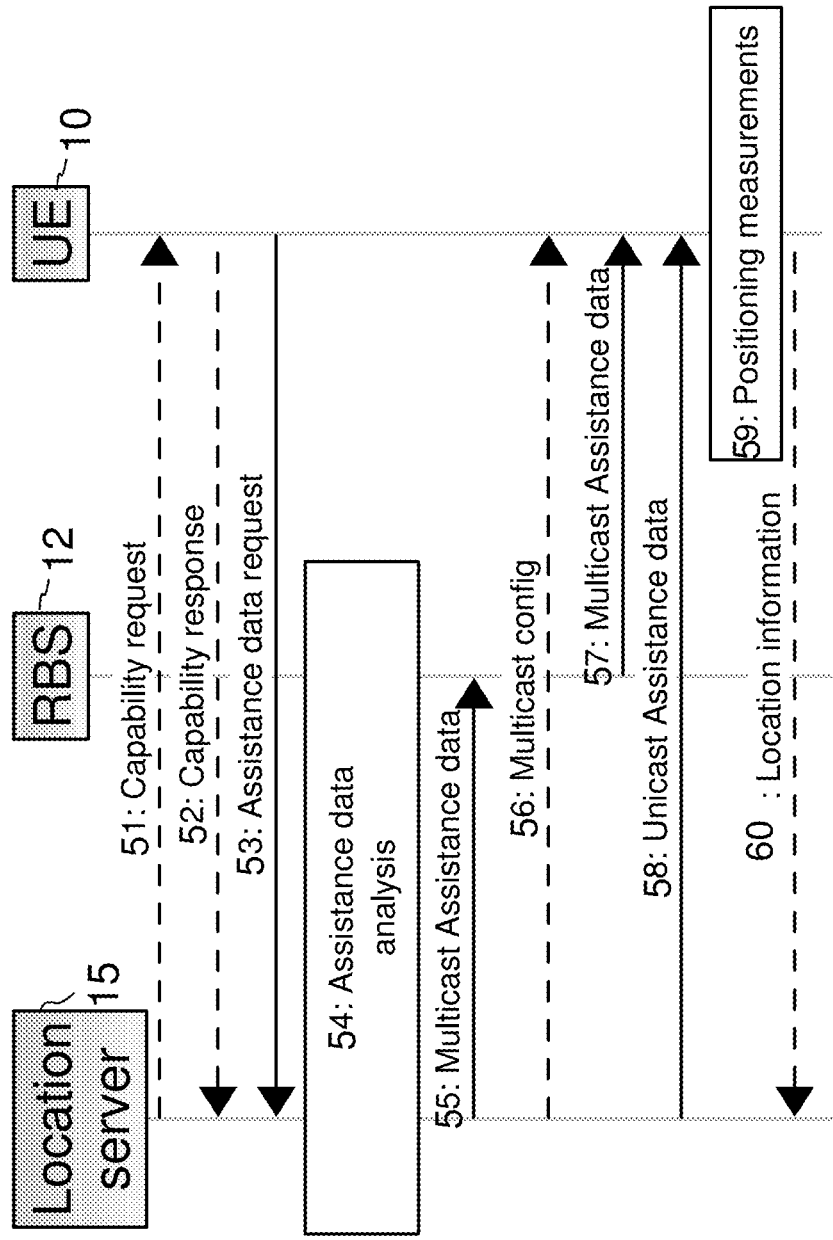
FIG. 5b is a combined flowchart and signalling scheme according to embodiments herein.

Some embodiments are shown with support of a signalling chart in FIG. 5b. The wireless device 10 and location server 15, being an example of the network node, optionally exchange capability information (actions 51 and 52) before the wireless device 10 requests assistance data (action 53). Based on the request from the wireless device 10 and optionally several other wireless devices, the location server 15 and possibly the network node such as the radio network node 12 denoted RBS may analyze (action 54) the number of wireless devices and the resource costs of providing the positioning assistance data. The parts of the positioning assistance data subject to broadcast exemplified herein as multicast in this figure is transferred to the radio network node (action 55), and the wireless device 10 is optionally informed about the broadcast or multicast configuration (action 56). The parts of the positioning assistance data subject to broadcast or multicast is transferred to the wireless device 10 (action 57). Parts that are subject to unicast provision are sent to the wireless device 10 (action 58). The wireless device 10 considers positioning assistance data part provided via unicast and/or broadcast to support positioning measurements (action 59), and optionally, the wireless device 10 may provide location information to the location server 15 (action 60).

Figure 6:
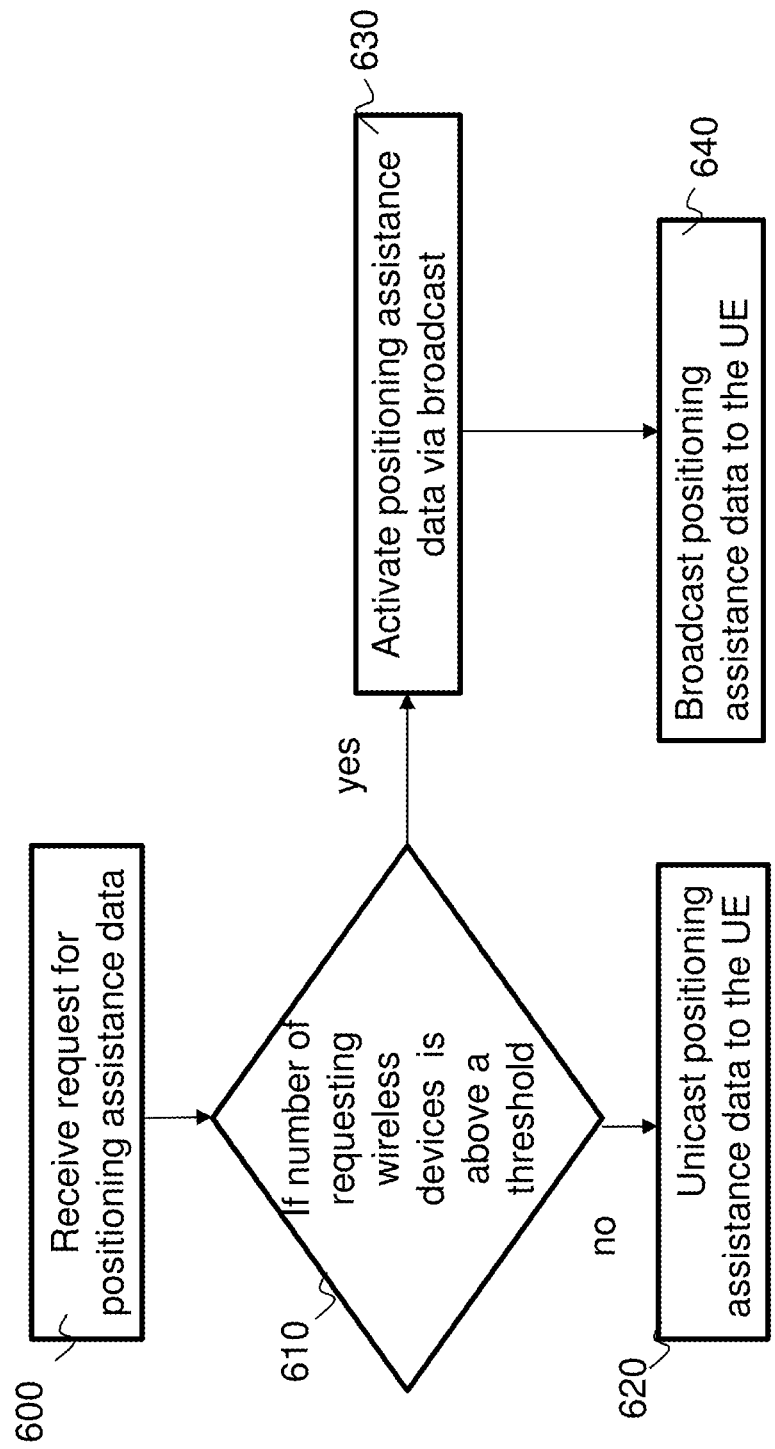
FIG. 6 shows an example of a method performed by a network node such as a location server according to embodiments herein.

FIG. 6 is a flowchart depicting an example of embodiments herein of the method performed by the network node where the positioning assistance data is sent via broadcast instead of a unicast when multiple wireless devices request same positioning assistance data.

Action 600. The network node receives from the wireless device a request for positioning assistance data.

Action 610. The network node may determine if or whether the number of requesting wireless devices is above a threshold.

Action 620. That not being the case, i.e. the number of wireless devices is below the threshold, the network node triggers a unicast of the positioning assistance data to the wireless device 10.

Action 630. That being the case, i.e. the number of wireless devices are above or equal the threshold, the network node triggers, also referred to as activates, a broadcast of the positioning assistance data e.g. via MBMS transmission.

Action 640. The network node being e.g. the radio network node 12, may thus broadcast the positioning assistance data to the wireless device 10.

Figure 7B:
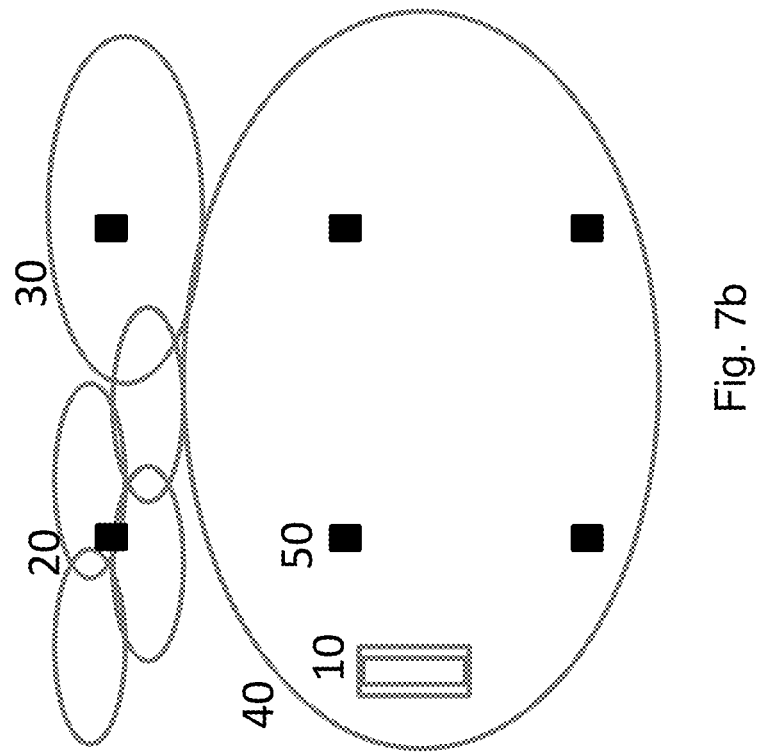
FIG. 7b shows an example of a virtual reference station grid.
Figure 7A:
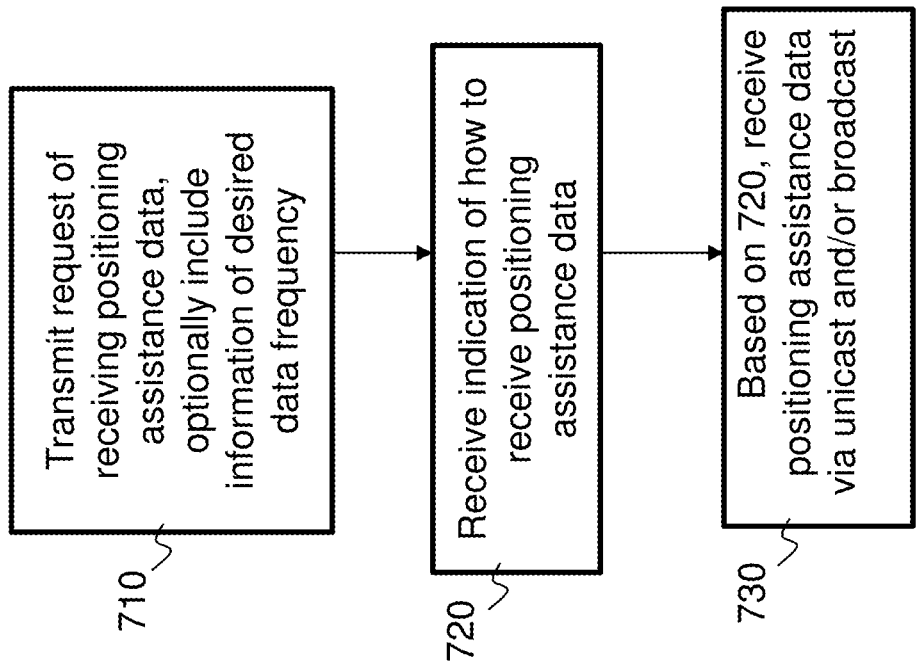
FIG. 7a shows an example of a method performed by a wireless device according to embodiments herein.

FIG. 7a is a flowchart depicting an example of embodiments herein of the method performed by the wireless device 10.

Action 710. The wireless device 10 may transmit a request of receiving positioning assistance data, optionally also includes information of desired data frequency.

Action 720. The wireless device 10 may receive an indication of how to receive positioning assistance data.

Action 730. The wireless device 10 may, based on the received indication, receive positioning assistance data, or an indication pointing to an index in a table, via broadcast and/or unicast.

As stated above in the case of RTK, the network node may prepare positioning assistance data such as correction information for a set of virtual reference stations (VRS) in the service area where the operator is providing communication services.

The set of VRSs can form a grid (50) as exemplified by FIG. 7b, where the wireless device 10 is served by radio base stations (20, 30, 40) in the same service area. The VRS grid points may correspond to one respective radio base station cell as in (30) or to several radio base stations as in (20). The coverage area of some radio base stations (40) may also be large enough to correspond to multiple VRS grid points. The location server or the individual radio base stations updates the correction information for the associated VRS grid points. The individual radio base stations may update the correction information directly via a correction information server or network function, or update via the location server.

The update rate may be different for different entities (base station, location server, UE) or different services or subscriptions.

Figure 8:
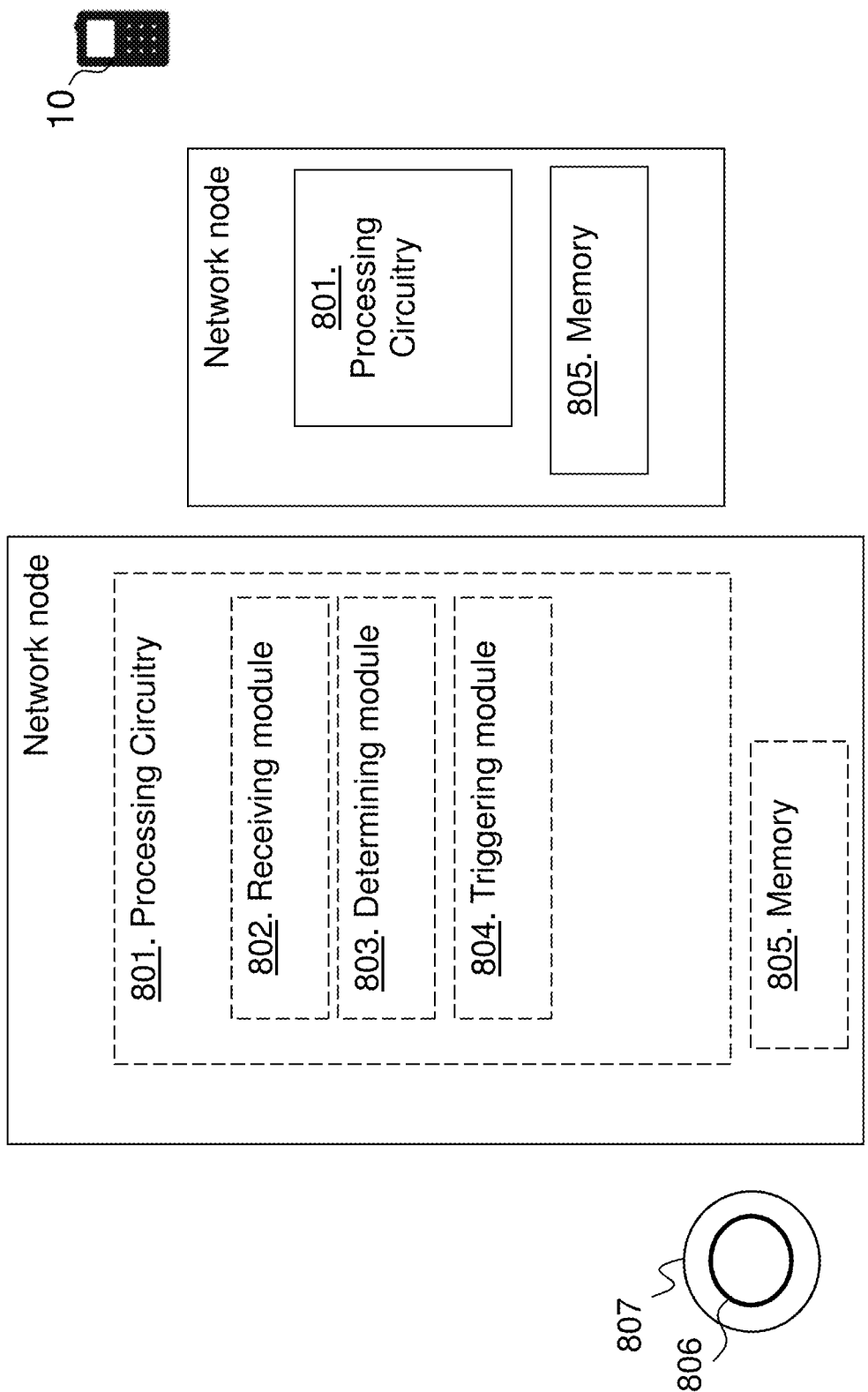
FIG. 8 is a schematic block diagram depicting a network node according to embodiments herein.

FIG. 8 is a schematic block diagram depicting the network node such as the location server 15 or the radio network node 12, for enabling, handling or managing positioning of the wireless device 10 in the wireless communications network 1.

The network node may comprise processing circuitry 801, e.g. one or more processors, configured to perform the methods herein.

The network node may comprise a receiving module 802, e.g. a receiver or a transceiver. The network node, the processing circuitry 801, and/or the receiving module 802 is configured to receive the request for the positioning assistance data. information about supported capabilities associated to positioning may also be received.

The network node may comprise a determining module 803. The network node, the processing circuitry 801, and/or the determining module 803 is configured to determine whether to transmit positioning assistance data, to the wireless device 10 using unicast and/or using broadcast e.g. configured to determine how to send the positioning assistance data to the wireless device 10. The network node, the processing circuitry 801, and/or the determining module 803 may be configured to determine whether to transmit using unicast and/or broadcast based on requests and/or subscription information of the wireless device 10. The network node, the processing circuitry 801, and/or the determining module 803 may be configured to determine whether to transmit using unicast and/or broadcast based on number of requests for the positioning assistance data to the network node.

The network node may comprise a triggering module 804, e.g. a transmitted or transceiver. The network node, the processing circuitry 801, and/or the triggering module 804 is configured to trigger the transmission, to the wireless device 10, of the positioning assistance data or the indication, such as an index pointer, of the positioning assistance data for the wireless device 10 wherein the transmission is a unicast transmission and/or a broadcast transmission to the wireless device 10 as determined. E.g. the network node, the processing circuitry 801, and/or the triggering module 804 may be configured to trigger an activation of a signalling in the manner decided in the determining action. That is, the network node, the processing circuitry 801, and/or the triggering module 804 is configured to initiate a unicast and/or a broadcast of the positioning assistance data to the wireless device 10. The network node, the processing circuitry 801, and/or the triggering module 804 may further be configured to trigger a transmission of an indication indicating that the positioning assistance data is broadcast and/or unicast.

The network node further comprises a memory 805 comprising one or more memory units. The memory 805 comprises instructions executable by the processing circuitry 801 to perform the methods herein when being executed in the network node. The memory 805 is arranged to be used to store e.g. positioning assistance data, type of RTK data for certain wireless devices, frequency of transmission of positioning assistance data, etc.

Figure 9:
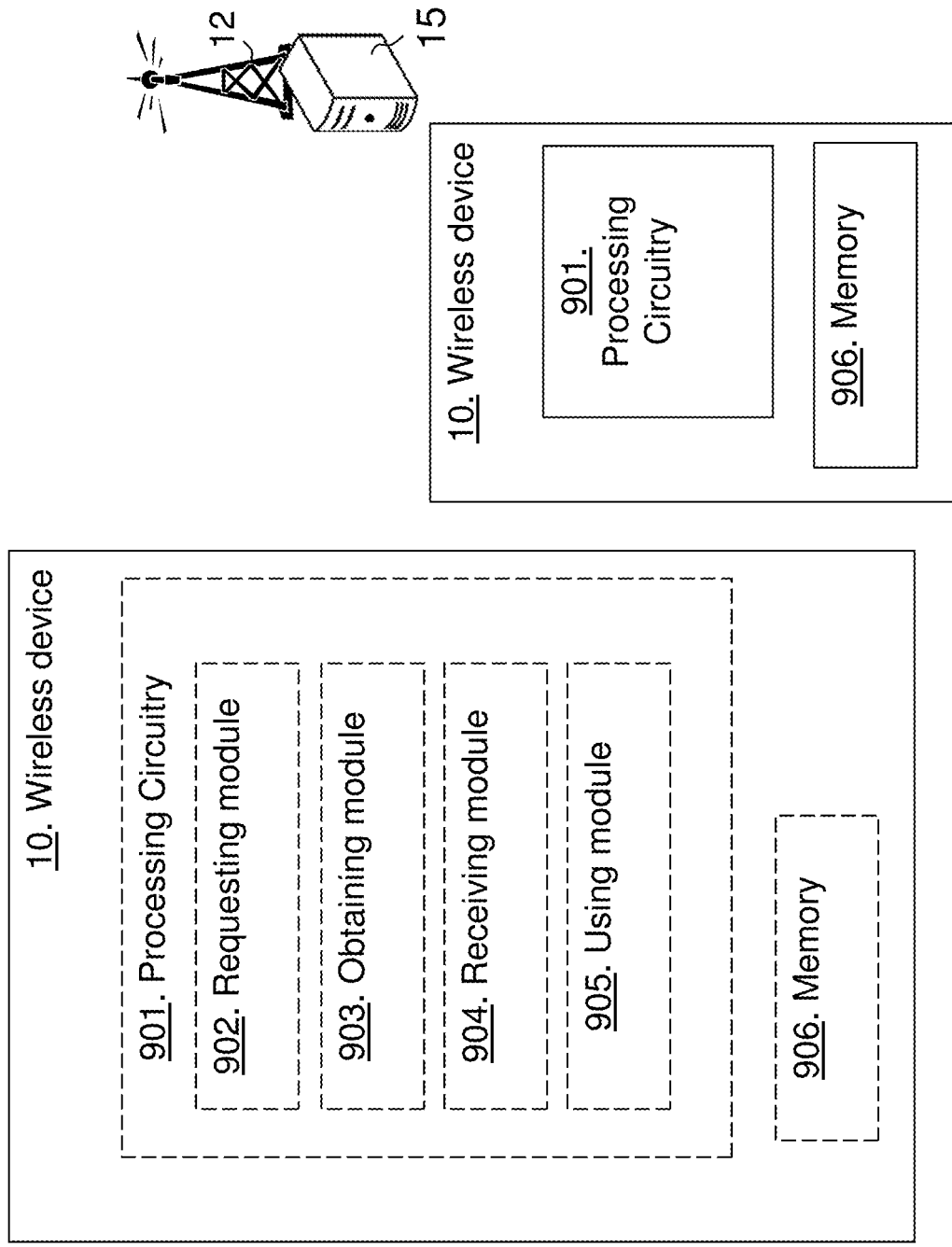
FIG. 9 is a schematic block diagram depicting a wireless device according to embodiments herein.

The methods according to the embodiments described herein for the network node are respectively implemented by means of e.g. a computer program product 806 or a computer program, comprising instructions, i.e., software code portions, which, when executed on at least one processor, cause the at least one processor to carry out the actions described herein, as performed by the network node. The computer program product 806 may be stored on a computer-readable storage medium 807, e.g. a disc, a universal serial bus stick or similar. The computer-readable storage medium 807, having stored thereon the computer program product, may comprise the instructions which, when executed on at least one processor, cause the at least one processor to carry out the actions described herein, as performed by the network node. In some embodiments, the computer-readable storage medium may be a non-transitory computer-readable storage medium. It is herein disclosed a network node comprising processing circuitry configured to determine whether to transmit positioning assistance data, to the wireless device using unicast and/or using broadcast; and to trigger a transmission, to the wireless device, of the positioning assistance data or an indication of the positioning assistance data for the wireless device, wherein the transmission is a unicast transmission and/or a broadcast transmission to the wireless device 10 as determined FIG. 9 is a schematic block diagram depicting the wireless device 10, in two embodiments, for enabling or handling positioning of the wireless device in the wireless communications network.

The wireless device 10 may comprise processing circuitry 901, e.g. one or more processors, configured to perform the methods herein.

The wireless device 10 may comprise a requesting module 902. The wireless device 10, the processing circuitry 901, and/or the requesting module 902 may be configured to request the positioning assistance data from the network node.

The wireless device 10 may comprise an obtaining module 903, such as a receiver or transceiver. The wireless device 10, the processing circuitry 901, and/or the obtaining module 903 may be configured to receive, from the network node, the indication indicating that the positioning assistance data is broadcast and/or unicast, e.g. configured to obtain, from the location server 15 or the radio network node 12, indication of how to receive the positioning assistance data.

The wireless device may comprise a receiving module 904, such as a receiver or transceiver. The wireless device 10, the processing circuitry 901, and/or the receiving module 904 is configured to receive from the network node positioning assistance data or the indication of the positioning assistance data for the wireless device 10 in a unicast transmission and/or a broadcast transmission, e.g. based on the received indication, receive positioning assistance data either over a unicast link and/or a broadcast link. The wireless device may comprise a using module 905. The wireless device 10, the processing circuitry 901, and/or the using module 905 may be configured to use the positioning assistance data in the positioning process e.g. for positioning the wireless device 10.

The wireless device 10 further comprises a memory 906 comprising one or more memory units. The memory 906 comprises instructions executable by the processing circuitry 901 to perform the methods herein when being executed in the wireless device 10. The memory 906 is arranged to be used to store e.g. information, data such as Positioning assistance data, how to receive the positioning assistance data, type of RTK data, etc.

The methods according to the embodiments described herein for the wireless device 10 are respectively implemented by means of e.g. a computer program product 907 or a computer program, comprising instructions, i.e., software code portions, which, when executed on at least one processor, cause the at least one processor to carry out the actions described herein, as performed by the wireless device 10. The computer program product 907 may be stored on a computer-readable storage medium 908, e.g. a universal serial bus (USB) stick, a disc or similar. The computer-readable storage medium 908, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium. It is herein disclosed a wireless device 10 comprising processing circuitry configured to receive from a network node, positioning assistance data or an indication of the positioning assistance data for the wireless device 10 in a unicast transmission and/or a broadcast transmission. The processing circuitry is further configured to use the positioning assistance data in a positioning process.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

The objectives of the newly agreed work item RP-170813, New WID: UE Positioning Accuracy Enhancements for LTE is to specify solutions for positioning enhancements in LTE in respect of positioning accuracy, availability, reliability and scalability, for both Normal UEs and BL UEs.

GNSS positioning enhancements:
  Specify the signalling and procedure to support RTK GNSS positioning over LPP and LPPa, taking into account both UE and network complexity. [RAN2, RAN3, RAN1]
  Specify support for IMU positioning:
    Specify the signalling and procedure to support IMU positioning over LPP and hybrid positioning including IMU related estimates. [RAN2, RAN1]
  Specify the signalling and procedure to support UE-based OTDOA positioning [RAN2]
  Broadcasting of assistance data [RAN2, RAN3, SA3, SA2]
    Specify a new SIB to support signalling of positioning assistance information for A-GNSS, RTK and UE-based OTDOA assistance information.
    Specify optional encryption procedure for broadcast assistance data, including mechanism for delivery of UE-specific encryption keys.

In the following contribution, we discuss the aspects of GNSS augmentation via cellular networks for accurate positioning, as well as some signalling aspects (LPP/LPPa).

Discussion

First, we address some possible GNSS augmentation extensions, followed by some signalling aspects.

GNSS Augmentation

Some GNSS augmentation is already supported in LTE via LPP 3GPP TS 25.305: "Stage 2 functional specification of User Equipment (UE) positioning in UTRAN" and 3GPP TS 36.355: "Evolved Universal Terrestrial Radio Access (E-UTRA); LTE Positioning Protocol (LPP)", including differential GNSS, RTCM 10402.3, RTCM Recommended Standards for Differential GNSS Service (v.2.3), Aug. 20, 2001, and satellite based augmentation systems (SBAS). Capable UEs can also be requested to report accumulated carrier phase measurements for accurate UE-assisted positioning.

For accurate UE-based positioning, there is also a need to address recent development in GNSS augmentation including RTK, RTCM 10403.3, RTCM Recommended Standards for Differential GNSS Service (v.3.3), Oct. 7, 2016. It is based on corrections from an associated reference station (RS), where the reference station can be an actual (typical the nearest) reference station. The accuracy depends on the relevance of and distance to the reference station. An alternative is instead to use a network of reference stations to interpolate corrections to virtual reference stations (VRS) in a grid over the supported area, where the distance between grid points is about 5 km. This means that based on a rough estimate of the device position it is possible to associate the device to an appropriate closest VRS. The scalability challenge with such an approach is that each device will poll the RTK server including its rough position estimate.

An alternative is
  1. E-SMLC polls the RTK server to obtain corrections associated to a set of VRSs,
  2. map each network element such as base station, transmission point, antenna system etc to a VRS,
  3. associate devices to network elements and thereby lookup corrections from an associated VRS

| | |
|---|---|
| Proposal 1 | RAN2 shall investigate scalable RTK solutions based on VRSs where E-SMLC updates RTK corrections associated to a set of VRSs. |

Accurate positioning can also be supported by Precise Point Positioning (PPP), where detailed satellite orbit trajectories and clock offsets is considered as GNSS augmentation data. When range estimates between device and satellites becomes more accurate, information such as PPP becomes more relevant.

| | |
|---|---|
| Proposal 2 | RAN2 shall investigate PPP solutions as GNSS augmentation extensions |

The GNSS augmentation can be divided into different parts based on
  1. Satellite system, such as GPS, GLONASS, SBAS, QZSS, Galileo, BDS etc
  2. Correction types, such as DGNSS, RTK, PPP
  3. Accuracy level and time resolution From an operator and service perspective, it can be relevant to provide differentiated access to different parts of the GNSS augmentation data.

| | |
|---|---|
| Proposal 3 | RAN2 shall investigate service differentiation by enabling access to different parts of the GNSS augmentation |

Signalling Aspects

Figure 10:
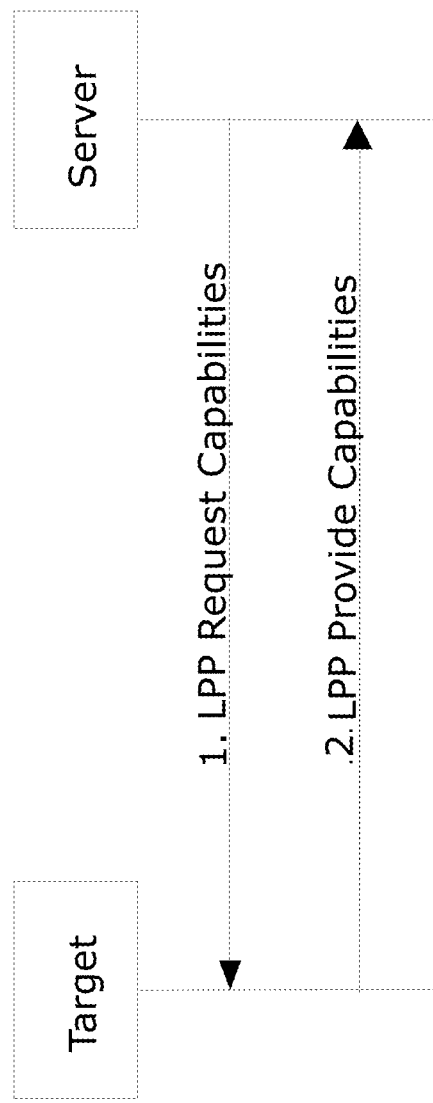
FIG. 10 shows an LPP Capability Transfer procedure.

Current LPP supports handling of capabilities, assistance data and location information to support GNSS positioning. The capabilities of the target device can be provided upon request from E-SMLC or unsolicited as illustrated by FIG. 10, where the LPP Request Capabilities is optional. The capabilities can be extended to also include more GNSS augmentation capabilities such as support for RTK.

| Proposal 4 | RAN2 shall investigate if additional capability definitions are needed for GNSS augmentation extensions. |
|---|---|

Figure 11:
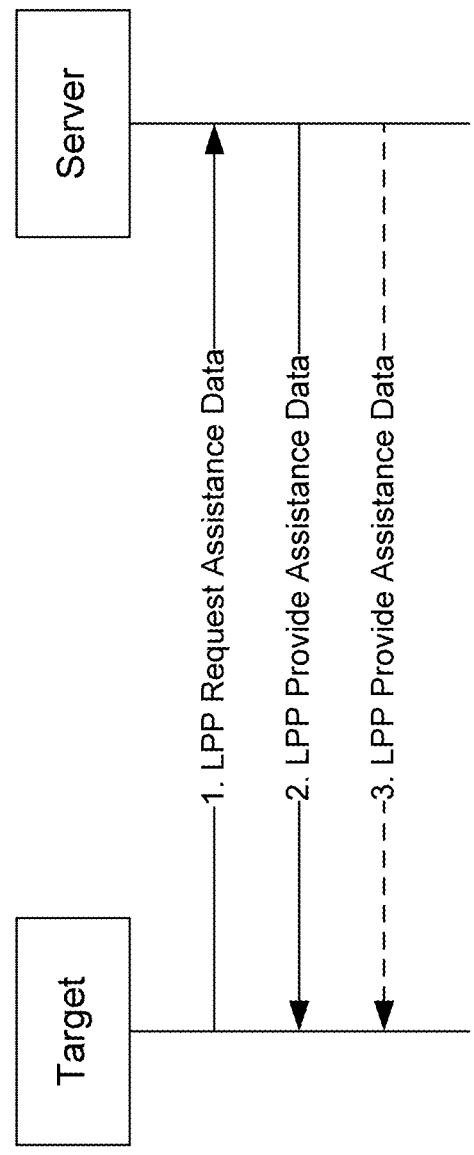
FIG. 11 shows an LPP Assistance Data Transfer procedure.

The target device can request for GNSS assistance data to be provided from E-SMLC, or the E-SMLC can provide the assistance data unsolicited. FIG. 11 depicts the assistance data transfer procedure, where the LPP Request Assistance Data is optional. There is already support for some GNSS differential corrections to support UE-based and UE-assisted positioning.

| Proposal 5 | RAN2 shall add agreed GNSS augmentation extensions to the GNSS assistance data and the request for the same |
|---|---|

Figure 12:
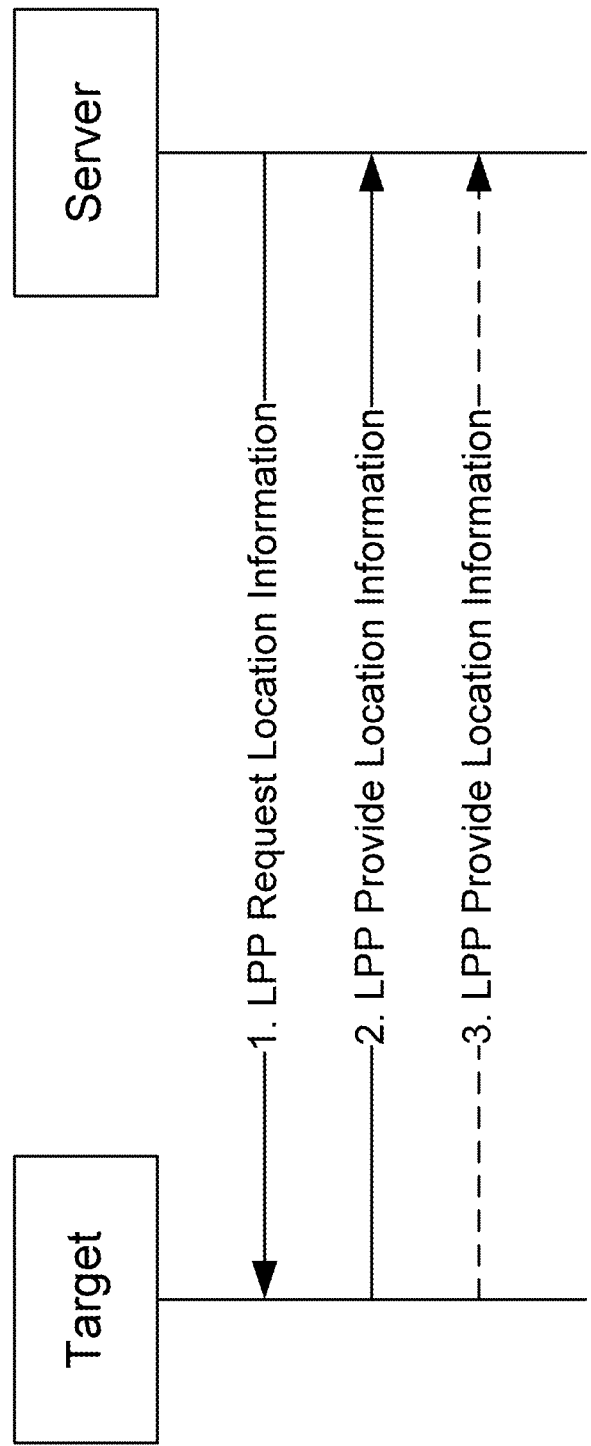
FIG. 12 shows an LPP Location Information Transfer procedure.

The target device provides location information, optionally on request from the E-SMLC as illustrated by FIG. 12. For UE-assisted positioning, there is already support for carrier phase measurement reporting in the form of accumulated carrier phase (accumulated deltarange, adr).

| Proposal 6 | RAN2 shall investigate if additional location information is needed for agreed GNSS augmentation extensions. |
|---|---|

Conclusion

In this contribution, we have addressed some possible GNSS augmentation extensions, together with some signalling aspects. Moreover, we have the following proposals:

| Proposal 1 | RAN2 shall investigate scalable RTK solutions based on VRSs where E-SMLC updates RTK corrections associated to a set of VRSs. |
|---|---|
| Proposal 2 | RAN2 shall investigate PPP solutions as GNSS augmentation extensions |
| Proposal 3 | RAN2 shall investigate service differentiation by enabling access to different parts of the GNSS augmentation |
| Proposal 4 | RAN2 shall investigate if additional capability definitions are needed for GNSS augmentation extensions. |
| Proposal 5 | RAN2 shall add agreed GNSS augmentation extensions to the GNSS assistance data and the request for the same |
| Proposal 6 | RAN2 shall investigate if additional location information is needed for agreed GNSS augmentation extensions. |

The objectives of the newly agreed work item RP-170813, New WID: UE Positioning Accuracy Enhancements for LTE, is to specify solutions for positioning enhancements in LTE in respect of positioning accuracy, availability, reliability and scalability, for both Normal UEs and BL UEs.
GNSS positioning enhancements:
  Specify the signalling and procedure to support RTK GNSS positioning over LPP and LPPa, taking into account both UE and network complexity. [RAN2, RAN3, RAN1]
Specify support for IMU positioning:
  Specify the signalling and procedure to support IMU positioning over LPP and hybrid positioning including IMU related estimates. [RAN2, RAN1]
Specify the signalling and procedure to support UE-based OTDOA positioning [RAN2]
Broadcasting of assistance data [RAN2, RAN3, SA3, SA2]
  Specify a new SIB to support signalling of positioning assistance information for A-GNSS, RTK and UE-based OTDOA assistance information.
  Specify optional encryption procedure for broadcast assistance data, including mechanism for delivery of UE-specific encryption keys.

In the following contribution, we discuss on how to specify a new SIB for positioning assistance information and the procedure on how to broadcast the positioning information.

Discussion

While considering a large amount of UEs supporting network-assisted positioning in a certain area, one efficient way to reduce the signalling overhead would be to broadcast the assistance information by the eNBs in the area in order to be used by all the UEs. There are already UE positioning operations on Uu interface previously defined in 3GPP TS 23.171, "Functional stage 2 description of location services in UMTS". The Uu interface may be used for broadcasting information which can be used by the UE for positioning operations.

For OTDOA and GNSS, UTRAN (the $3^{rd}$ generation of wireless networks) has already support for broadcast assistance data to the UE 3GPP TS 25.305, "Stage 2 functional specification of User Equipment (UE) positioning in UTRAN". In order to introduce support for assistance data broadcast in LTE, a new System Information Block (SIB) is needed for positioning. In the following subsections we will explain further how these supports should be managed for LTE.

| Proposal 7 | A new System Information Block (SIB) is required to broadcast all necessary positioning assistance information. |
|---|---|

Some part of the positioning information may be similar in all cells in one region, also it is logical to consider a similar broadcast message can be sent for many UEs. It is interesting to investigate using evolved Multimedia Broadcast Multicast Services (eMBMS) which is a point to multi-point interface specification for 3GPP networks.

| Proposal 8 | eMBMS may be investigated as a potential solution for broadcasting positioning assistance information. |
|---|---|

Broadcasting of Assistance Data for OTDOA

For TDOA positioning, it is possible to assume that the assistance information can be provided in a broadcast system information block (SIB). The assistance data to be broadcasted for OTDOA should contain the list of reference and neighbor cells information which contain PRS configuration. For each neighbor cell, the approximate cell timing information may also be included.

| Proposal 9 | For OTDOA assistance information, the SIB should contain the reference and neighbor cells information in terms of PRS configuration details, which are currently available in LPP. |
|---|---|

Broadcasting of Assistance Data for A-GNSS

Similarly, the assistance data to be broadcasted for assisted GNSS may contain a subset of or all of the following information: reference time, reference position, differential GNSS (DGNSS) corrections, ephemeris and clock corrections, and almanac and other data. The broadcast message may be ciphered.

| | |
|---|---|
| Proposal 10 | For A-GNSS assistance information, the SIB may contain reference time, reference position, DGNSS corrections, ephemeris and clock corrections and almanac. |

Broadcasting of Assistance Data for RTK GNSS

While we believe that RTK GNSS data has a great potential to improve the positioning accuracy in LTE, broadcasting this assistance data may introduce a large overhead to the network. The message size including this data depends of e.g. ambition level and message format but it is still expected to be around 2 kbit per satellite constellation, which could be updated every 1-5 seconds. A satellite constellation is a group of artificial satellites working in concert. Such a constellation can be considered to be a number of satellites with coordinated ground coverage, operating together under shared control, synchronized so that they overlap well in coverage, the period in which a satellite or other spacecraft is visible above the local horizon. The initial setting for the eNB may be to not consider broadcasting of RTK GNSS assistance data, while in case there were many RTK request over RRC for one particular eNB, then at some point it would be efficient to broadcast this information in that particular eNB. Therefore, both unicast and broadcast of RTK data may be considered, and that the selection may depend on the number of subscribing UEs.

| | |
|---|---|
| Observation 1 | The RTK GNSS assistance data message size depends on ambition level and message format; however, it is expected to have around 2 kbit/s per satellite constellation. |
| Proposal 11 | The RTK GNSS assistance data may not necessarily be broadcasted, and it may be provided upon request over RRC. |
| Proposal 12 | In case of many RTK request over RRC for one particular eNB, then the eNB may decide to broadcast this information. |

Conclusion

Here is the list of observation and proposals presented in this contribution:

Observation 1 The RTK GNSS assistance data message size depends on ambition level and message format; however, it is expected to have around 2 kbit/s per satellite constellation.

| | |
|---|---|
| Proposal 13 | A new System Information Block (SIB) is required to broadcast all necessary positioning assistance information. |
| Proposal 14 | eMBMS may be investigated as a potential solution for broadcasting positioning assistance information. |
| Proposal 15 | For OTDOA assistance information, the SIB may contain the reference and neighbor cells information in terms of PRS configuration details, which are currently available in LPP. |
| Proposal 16 | For A-GNSS assistance information, the SIB may contain reference time, reference position, DGNSS corrections, ephemeris and clock corrections and almanac. |
| Proposal 17 | The RTK GNSS assistance data may not be broadcasted, and it may be provided upon request over RRC. |
| Proposal 18 | In case of many RTK request over RRC for one particular eNB, then this data can be broadcasted at that certain eNB. |

It is herein disclosed a method performed by a network node such as a location server or a radio network node for handling or managing positioning of a wireless device in a wireless communications network. The network node determines how to signal positioning assistance data, i.e. whether to transmit the positioning assistance data, to the wireless device using unicast and/or broadcast. The network node then transmits the positioning assistance data or an indication of the positioning assistance data for the wireless device using the determined signalling i.e. using unicast and/or broadcast.

It is further herein disclosed a method performed by a wireless device for handling or managing positioning of the wireless device in a wireless communications network. The wireless device may request positioning assistance data from the wireless communications network such as from a network node. The wireless device then receives from the network node, e.g. from a location server or via a radio network node, positioning assistance data unicast and/or broadcast. The wireless device uses the positioning assistance data in a positioning process.

It is furthermore provided herein a computer program product comprising instructions, which, when executed on at least one processor, cause the at least one processor to carry out any of the methods above, as performed by the wireless device or network node. It is additionally provided herein a computer-readable storage medium, having stored thereon a computer program product comprising instructions which, when executed on at least one processor, cause the at least one processor to carry out the method according to any of the methods above, as performed by the wireless device or network node.

Furthermore, it is herein provided a wireless device and a network node configured to perform the methods herein.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for managing positioning of wireless devices in a wireless communications network, the method comprising:
    determining, where one or more requests for positioning assistance data are pending, whether the number of pending requests exceeds a threshold, the pending requests corresponding to requesting wireless devices operating in the wireless communications network; and
    triggering a broadcast transmission of the positioning assistance data or an indication of the positioning assistance data for the requesting wireless device, responsive to the number of pending requests exceeding the threshold, and otherwise triggering unicast transmissions of the positioning assistance data or the indication of the positioning assistance data for the requesting wireless devices.

2. The method according to claim 1, further comprising triggering transmission of an indication indicating whether the positioning assistance data is to be transmitted via broadcast transmission.

3. The method according to claim 1, wherein the transmission is performed by the network node or a radio network node.

4. A network node configured for managing positioning of a wireless device in a wireless communications network, wherein the network node comprises:
    communication circuitry; and
    processing circuitry operatively associated with the communication circuitry and configured to:
        determine, where one or more requests for positioning assistance data are pending, whether the number of pending requests exceeds a threshold, the pending requests corresponding to requesting wireless devices in the wireless communications network; and trigger a broadcast transmission; of the positioning assistance data or an indication of the positioning assistance data, responsive to the number of pending requests exceeding the threshold, and otherwise trigging unicast transmissions of the positioning assistance data or the indication of the positioning assistance data for the requesting wireless devices.

5. The network node according to claim 4, wherein the processing circuitry is further configured to trigger a transmission of an indication indicating whether the positioning assistance data is to be transmitted via broadcast transmission.

6. The network node according to claim 4, wherein the network node is a location server or a radio network node.

* * * * *